(12) United States Patent
Balasubramanian

(10) Patent No.: US 8,140,993 B2
(45) Date of Patent: Mar. 20, 2012

(54) NOTIFICATION OF STATE TRANSITION OF AN OUT-OF-FOCUS APPLICATION WITH STATE AND NOTIFICATION PRIORITY FILTERING

(75) Inventor: Swaminathan Balasubramanian, Sterling Heights, MI (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 12/039,935

(22) Filed: Feb. 29, 2008

(65) Prior Publication Data
US 2008/0155454 A1    Jun. 26, 2008

Related U.S. Application Data

(63) Continuation-in-part of application No. 11/756,700, filed on Jun. 1, 2007, which is a continuation-in-part of application No. 11/505,131, filed on Aug. 15, 2006.

(51) Int. Cl.
*G06F 3/048* (2006.01)
(52) U.S. Cl. .................. 715/779; 715/808; 715/810
(58) Field of Classification Search ............... 715/779, 715/808, 810
See application file for complete search history.

(56) References Cited

U.S. PATENT DOCUMENTS

| | | | |
|---|---|---|---|
| 5,559,802 A | 9/1996 | Robinson et al. | |
| 5,617,526 A | 4/1997 | Oran et al. | |
| 5,867,160 A | 2/1999 | Kraft, IV et al. | |
| 5,991,794 A | 11/1999 | Hodges et al. | |
| 6,115,041 A | 9/2000 | Dang et al. | |
| 6,405,361 B1 | 6/2002 | Broy et al. | |
| 6,756,999 B2 | 6/2004 | Stoakley et al. | |
| 6,857,105 B1 | 2/2005 | Fox et al. | |
| 7,137,119 B1 | 11/2006 | Sankaranarayan et al. | |
| 2001/0035882 A1 | 11/2001 | Stoakley et al. | |
| 2003/0041179 A1 | 2/2003 | Snead et al. | |
| 2004/0066414 A1 | 4/2004 | Czerwinski et al. | |
| 2007/0006093 A1 | 1/2007 | Day et al. | |
| 2007/0157099 A1 | 7/2007 | Haug | |
| 2007/0157223 A1 | 7/2007 | Cordray et al. | |
| 2007/0261005 A1 | 11/2007 | Kreiner | |
| 2008/0046100 A1 | 2/2008 | Balasubramanian | |
| 2008/0046832 A1 | 2/2008 | Balasubramanian | |
| 2008/0155455 A1 | 6/2008 | Balasubramanian | |
| 2008/0163258 A1 | 7/2008 | Balasubramanian | |
| 2010/0138779 A1 | 6/2010 | Portele et al. | |

OTHER PUBLICATIONS

Bardram et al., Support for Activity-Based Computing in a Personal Computing Operating System, FIG. 2, Status Buttons has icon overlay, Apr. 2006.
Icon Overlay, Google Images, Jul. 10, 2006.
Office Action (Mail Date Apr. 8, 2011) for U.S. Appl. No. 12/039,977, filed Feb. 29, 2008; Confirmation No. 8538.
Advisory Action (Mail Date Nov. 25, 2011) for U.S. Appl. No. 12/039,977; filed Feb. 29, 2008.
Final Office Action (Mail Date Nov. 28, 2011) for U.S. Appl. No. 12/040,012; filed Feb. 29, 2008.

*Primary Examiner* — Namitha Pillai
(74) *Attorney, Agent, or Firm* — Schmeiser, Olsen & Watts; Anna Linne

(57) ABSTRACT

A method, a computer program product, a computer system and a method for supporting an application. The method includes: starting one or more applications, each application of the one or more applications having multiple possible states; displaying a taskbar on a computer screen, the taskbar having an application state filter select button; creating a corresponding task button representing each application of the one or more applications; upon selection of the application state filter select button, displaying a list of state filters on the computer screen; and upon selection of a state filter from the list of state filters, displaying task buttons corresponding only to those applications presently in a state corresponding to the selected state filter.

33 Claims, 15 Drawing Sheets

NOTIFICATION OF STATE TRANSITION OF AN OUT-OF-FOCUS APPLICATION WITH STATE AND NOTIFICATION PRIORITY FILTERING

This application is a Continuation-In-Part of copending application Ser. No. 11/756,700 filed on Jun. 1, 2007, which is a Continuation-In-Part of copending application Ser. No. 11/505,131 filed on Aug. 15, 2006.

FIELD OF THE INVENTION

The present invention relates to the field of computer software; more specifically, it relates to method for notification of a user of a state transition of an out-of-focus software application.

BACKGROUND OF THE INVENTION

The widespread availability of high performance computers has enabled users to run multiple applications simultaneously on their workstations. This has resulted in applications competing for user attention and interruptions of applications the user is currently interfacing with. Furthermore, there is no uniform methodology for applications to obtain the user's attention. Users are thus subject to interruptions and productivity is adversely affected when an application is idle and waiting for user attention or the user is forced to transfer their attention to another application. Additionally, when many applications are running, task buttons associated with the applications can be so cluttered as to render them unintelligible to the user.

Therefore, there is a need for a method for applications to notify the user of an applications status change and need for attention without interrupting the user and the application the user is currently working with as well as filtering task buttons displayed on a computer screen associated with the applications.

SUMMARY OF THE INVENTION

A first aspect of the present invention is a method, comprising: starting one or more applications, each application of the one or more applications having multiple possible states; displaying a taskbar on a computer screen, the taskbar having an application state filter select button; creating a corresponding task button representing each application of the one or more applications; upon selection of the application state filter select button, displaying a list of state filters on the computer screen; and upon selection of a state filter from the list of state filters, displaying task buttons corresponding only to those applications presently in a state corresponding to the selected state filter.

A second aspect of the present invention is a computer program product, comprising a computer useable medium having a computer readable program therein, wherein the computer readable program when executed on a computer causes the computer to: load one or more applications into computer memory, each application of the one or more applications having multiple possible states; display a taskbar on a computer screen, the taskbar having an application state filter select button; create a task button representing each application of the one or more applications; upon selection of the application state filter select button, display a list of state filters on the computer screen; and upon selection of a state filter from the list of state filters, display task buttons corresponding only to those applications presently in a state corresponding to the selected state filter A third aspect of the present invention is a computer system comprising a processor, an address/data bus coupled to the processor, and a computer-readable memory unit coupled to communicate with the processor, the memory unit containing instructions that when executed implement a method for dynamically notifying a user of a change in state of an application running on the computer system, the method comprising the computer implemented steps of: loading one or more applications into the memory unit, each application of the one or more applications having multiple possible states; displaying a taskbar on a computer screen, the taskbar having an application state filter select button; creating a corresponding task button representing each application of the one or more applications; upon selection of the application state filter select button, displaying a list of state filters on the computer screen; and upon selection of a state filter from the list of state filters, displaying task buttons corresponding only to those applications presently in a state corresponding to the selected state filter.

A fourth aspect of the present invention is a process for supporting computer infrastructure, the process comprising providing at least one support service for at least one of creating, integrating, hosting, maintaining, and deploying computer-readable code in a computing system, wherein the code in combination with the computing system is capable of performing a method for user filtering taskbar display of application task buttons, the method comprising: loading one or more applications into a computer memory, each application of the one or more applications having multiple possible states; displaying a taskbar on a computer screen, the taskbar having an application state filter select button; creating a corresponding task button representing each application of the one or more applications; upon selection of the application state filter select button, displaying a list of state filters on the computer screen; and upon selection of a state filter from the list of state filters, displaying task buttons corresponding only to those applications presently in a state corresponding to the selected state filter.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

Figure 1:
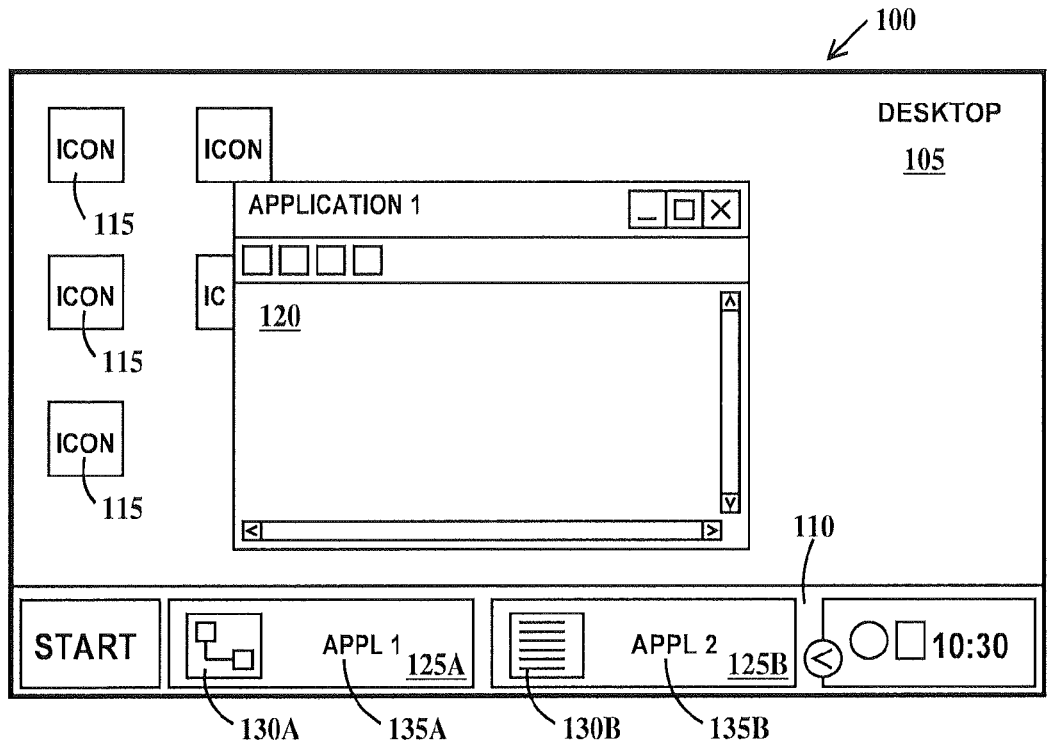
FIG. 1 is a schematic drawing of a user desktop illustrating an in-focus application and an out-of-focus application running simultaneously according to embodiments of the present invention.

A window is defined as a visual area containing a user interface displaying the output of and allowing input to a number of simultaneously running computer processes. A control widget is defined as means that a computer user interacts with in order to control and interface component such as a window or a text box. Control widgets come in two forms, virtual and physical. A button is an example of a control widget. A virtual button can be clicked with a mouse cursor while a physical button can be pressed with a finger.

In computing, the focus is the component of the graphical user interface, which is currently selected. Text entered at a keyboard or pasted from a clipboard is sent to the application, which currently has the focus. Graphical user interfaces also use a mouse cursor. Moving the mouse will typically move the mouse cursor over the screen and windows displayed on the screen without changing the focus. In a Microsoft™ windows system or an Apple™ computer, the focus can be changed by clicking on a component that can receive focus with the mouse. Clicking a mouse button when the mouse cursor is over a window selects the window to be in-focus. This is called a "focus follows click" policy or "click to focus". Focus may also be changed using the keyboard. In a UNIX computer system, the "focus follows the mouse cursor" policy is used.

An in-focus application is defined as a running application that has been selected by a control widget and to which any user input will be directed. For example, placing a cursor over a window and clicking a mouse button will put the application running in the window in focus and keyboard strokes will be inputted into the in-focus application. An out-of-focus application is a running application to which user input is not directed. For example, any keyboard strokes will be not be inputted into the out-of-focus application. Alternatively, an out-of-focus application can be defined as an application that is not in focus.

When multiple applications are running (running includes time when the application is idle, i.e., the application is loaded into memory but not processing), one application is considered "in-focus" and the others are considered "out-of-focus". Idle applications can receive input, but only when they are in-focus. Control widgets within windows may require a further click to focus them, to differentiate the different places input may go.

Examples of applications include, but are not limited to, word processors, spread sheets, computer aided design (CAD) programs, audio, picture and video editing programs, communication programs, email programs web browsers and various utility programs.

In certain operating systems, such as Microsoft™ Windows, the computer screen displays a desktop, which may include application desktop icons (control widgets) and a taskbar (control widget). In the taskbar a task button (control widget) is displayed for each running application. The task button includes a task button icon and a title. In-focus and out-of-focus applications may also appear in windows displayed on the desktop. The in-focus application is indicated by a highlighted task button and/or highlighted window associated with the in-focus application. A title-bar appears at the top of the window. The exit, minimize and restore/maximize buttons found in the upper right hand corner of the title bar are control widgets.

There are several types of special windows in a graphical user interface in addition to the application/document window displaying the application. One type of special window is a dialog box. In a dialog box appears when communication is requested or required outside the applications normal workflow between the application or operating system and the user. A dialog box is another type of widget. In non-model or modeless dialog box focus is not changed when it appears. In a modal dialog box, focus is changed to the dialog box.

The embodiments of the present invention will be described in the context of a windows-like operating system that utilizes a taskbar, but is applicable to other types of operating systems such as UNIX, which do not use a taskbar, but do display icons on the desktop. In the case of such operating systems, the features of the present invention are applied to the desktop icon instead of the task button icon. Alternatively, for applications that do use a desktop icons and taskbar task button icons, icon overlays may be applied to both the desktop icons and the task button icons.

In one example, the present invention modifies the task button icons by adding an icon overlay to the task button icon. The icon overlay indicates the state of the application and changes when the application changes state (transitions between states) in order to dynamically notify the user of a change in state of the applications without forcing itself on the user. Icon overlays may be applied to only out-of-focus applications or both in-focus and out-of-focus applications.

FIG. 1 is a schematic drawing of a user desktop illustrating an in-focus application and an out-of-focus application running simultaneously according to embodiments of the present invention. In FIG. 1, a desktop 100 (displayed on a computer screen) includes a workspace region 105 and a taskbar region 110. Displayed in workspace region are icons 115 for various applications and a window 120 displaying an in-focus application. Taskbar region 110 includes a first task button 125A and a second task button 125B. First task button 125A includes a task button icon 130A and a title 135A (APPL 1). Second task button 125B includes a task button icon 130B and a title 135B (APPL 2). First task button 125A is associated with a first application running in window 120. Second task button 125B is associated with a second out-of-focus application. Task button icon 130B is the standard task button icon for the second application. The absence of an overlay icon indicates the second application is loaded but is in a state that does not require user notification (for example, idle).

Figure 2:
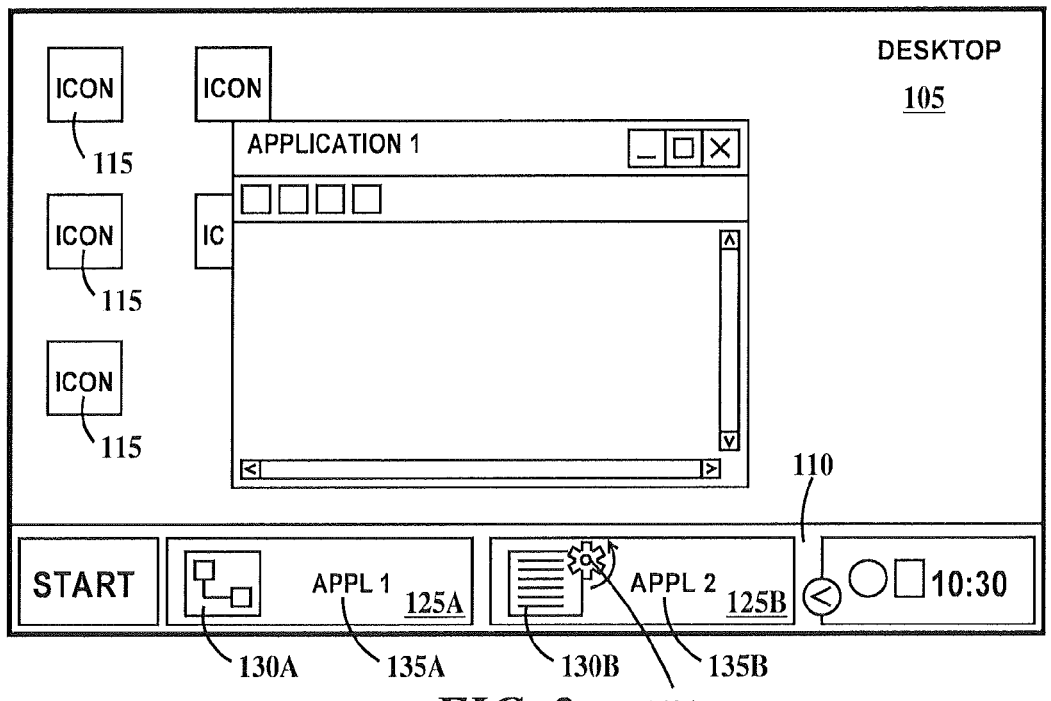
FIG. 2 is a schematic drawing of a user desktop illustrating the out-of-focus application indicating normal activity according to embodiments of the present invention.

FIG. 2 is a schematic drawing of a user desktop illustrating the out-of-focus application indicating normal activity according to embodiments of the present invention. In FIG. 2, the second application has changed state and is now running. To inform the user of the new status of the second application an overlay icon 140A is imposed over standard icon 130B. Overlay icon 140A may be animated. In the example of FIG. 2, overlay icon 140A is a spinning gear. Alternatively, standard icon 130B is replaced with a whole new icon that includes the overlay icon 140A graphics.

Figure 3:
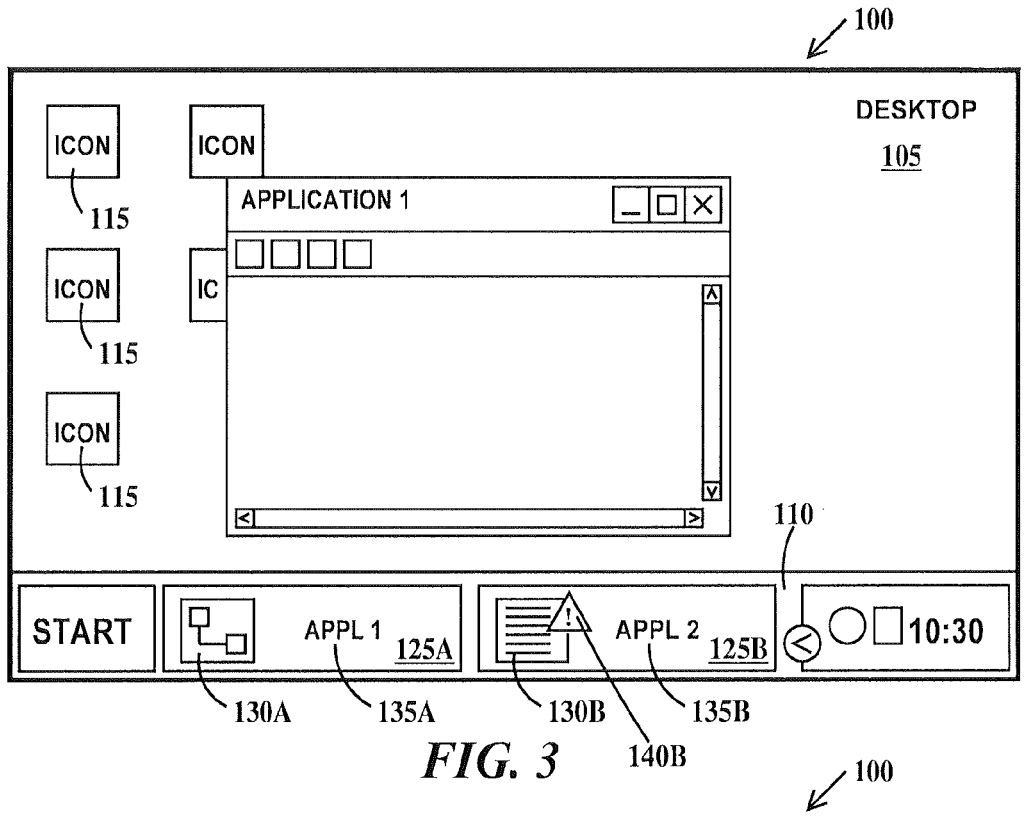
FIG. 3 is a schematic drawing of a user desktop illustrating the out-of-focus application indicating user response required according to embodiments of the present invention.

FIG. 3 is a schematic drawing of a user desktop illustrating the out-of-focus application indicating user response required according to embodiments of the present invention. In FIG. 3, the second application has again changed to a new state where processing has been stopped because user input is required. To inform the user of the new status of the second application (i.e., processing stopped because input is required) an overlay icon 140B is imposed over standard icon 130B. In the example of FIG. 3, overlay icon 140B is triangle with an exclamation point. In one example, the color of overlay icon may be selected to enhance the visual clue given by the presence of the overlay icon graphics. For example, overlay icon 140B may have a yellow background. In one example, an audio clue may be associated with overlay icon 140B. Combinations of animation, audio and color clues may be used together. Alternatively, standard icon 130B (see FIG. 1) is replaced with a whole new icon that includes the overlay icon 140B graphics. The out-of-focus application remains out-of-focus until the user presses second task button 125B, which will bring the second application up in a window so the user may supply the required input.

Figure 4:
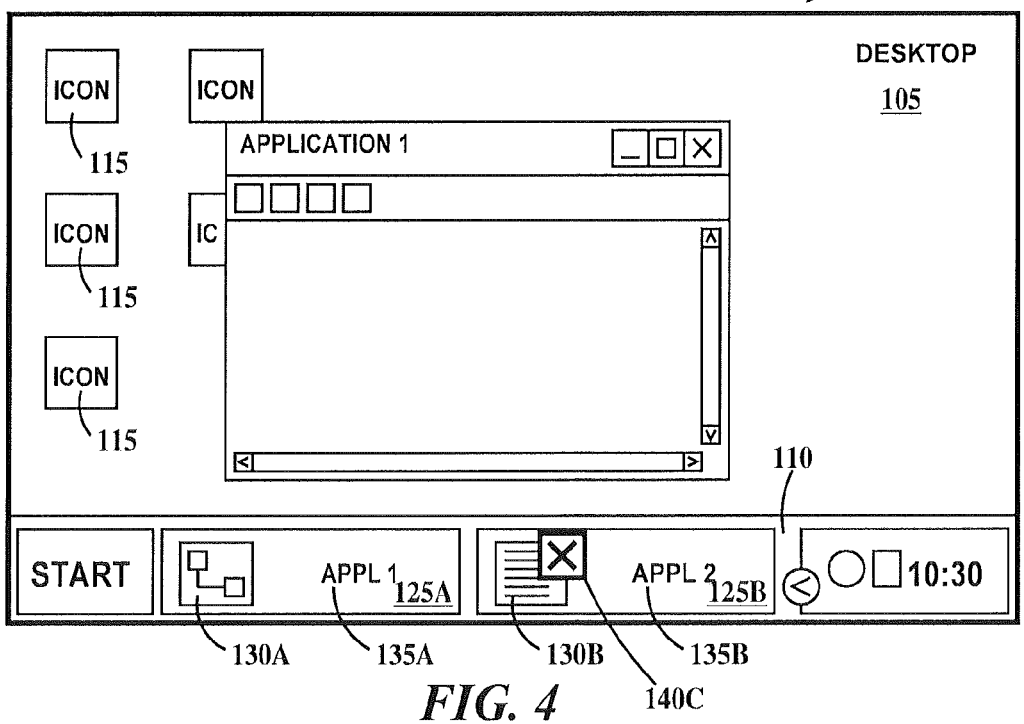
FIG. 4 is a schematic drawing of a user desktop illustrating the out-of-focus application indicating an error has occurred according to embodiments of the present invention.

FIG. 4 is a schematic drawing of a user desktop illustrating the out-of-focus application indicating an error has occurred according to embodiments of the present invention. In FIG. 4, the second application has again changed state where processing has been stopped because of an error. To inform the user of the new status of the second application (i.e., processing has stopped because an error has occurred) an overlay icon 140C is imposed over standard icon 130B. In one example, overlay icon 140C is animated. In the example of FIG. 4, overlay icon 140B is square with an X. In one example, the color of overlay icon may be selected to enhance the visual clue given by the presence of the overlay icon graphics. For example, overlay icon 140C may have a red background. In one example, an audio clue may be associated with overlay icon 140C. Combinations of animation, audio and color clues may be used together. Alternatively, standard icon 130B (see FIG. 1) is replaced with a whole new icon that includes the overlay icon 140B graphics. The out-of-focus application remains out-of-focus until the user presses second task button 125B, which will allow the user to respond to the error. There are two different actions possible as illustrated in FIGS. 5 and 6 and described infra.

Figure 5:
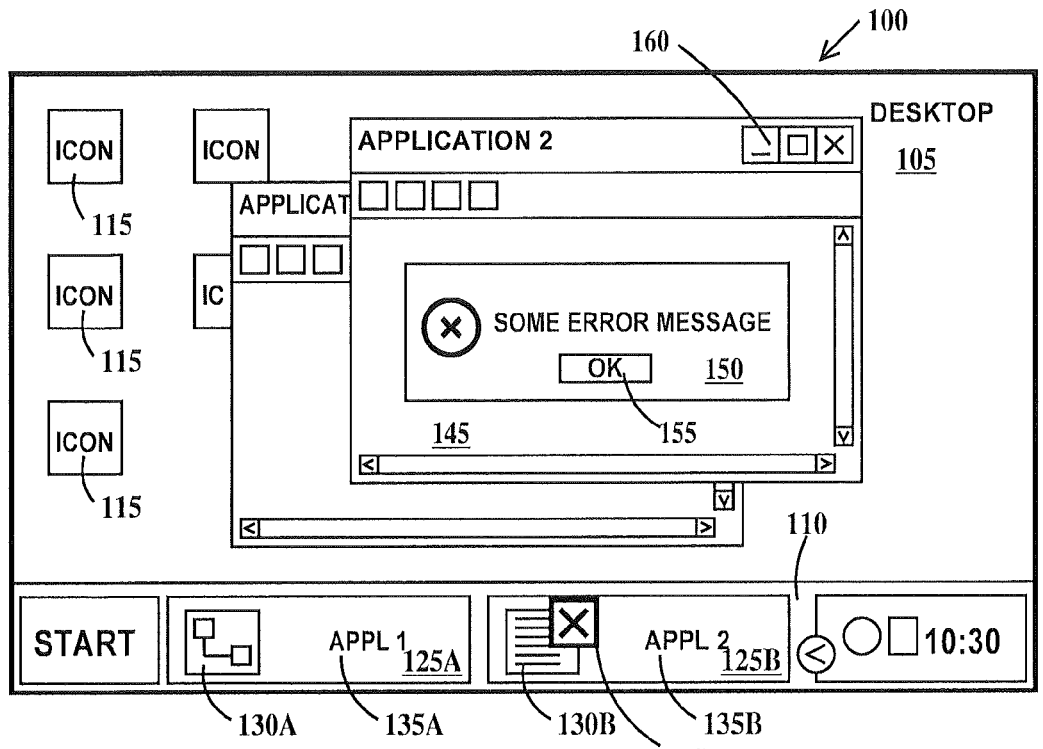
FIG. 5 is a schematic drawing of a user desktop after a user response to an error message of the out-of-focus application according to embodiments of the present invention.

FIG. 5 is a schematic drawing of a user desktop after a user response to an error message of the out-of-focus application according to embodiments of the present invention. In FIG. 5, the user has "pressed" task button 125B in response to the error clue and a window 145 for the second application has opened on desktop 105, bringing the second application into focus. Additionally, an error message window 150 has opened giving information about the error. After pressing an OK button 155, error message window 150 will close leaving window 145 open (the application will be in-focus) and the user may correct the error. The user may then close window 145 by pressing a minimize task button 160 returning the second application to out-of-focus operation.

Figure 6:
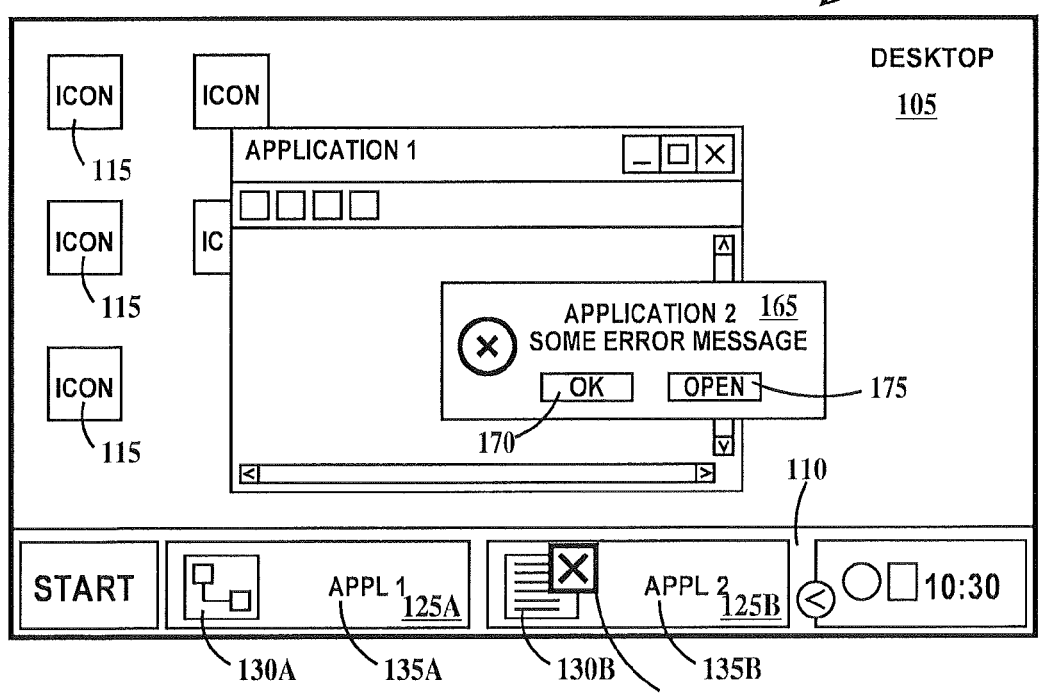
FIG. 6 is a schematic drawing of an alternative user desktop after a user response to an error message of the out-of-focus application according to embodiments of the present invention.

FIG. 6 is a schematic drawing of an alternative user desktop after a user response to an error message of the out-of-focus application according to embodiments of the present invention. In FIG. 6, the user has "pressed" task button 125B in response to the error clue and error message window 165 giving information about the error for the second application has opened on desktop 105. However, the second application is still out-of-focus. If the user "presses" an OK button 170, error window 165 will close, the second application will remain out-of-focus and overlay icon 140C is still present. If the user "presses" an OPEN button 175, error message window 165 will close and a window similar to window 145 of FIG. 5 will open. The application will be in-focus and the user may correct the error. The user may then close this window by pressing a minimize task button returning the second application to out-of-focus mode. This alternative behavior of the application allows the user to determine when to deal with the error without changing the focus of any application.

Figure 7A:
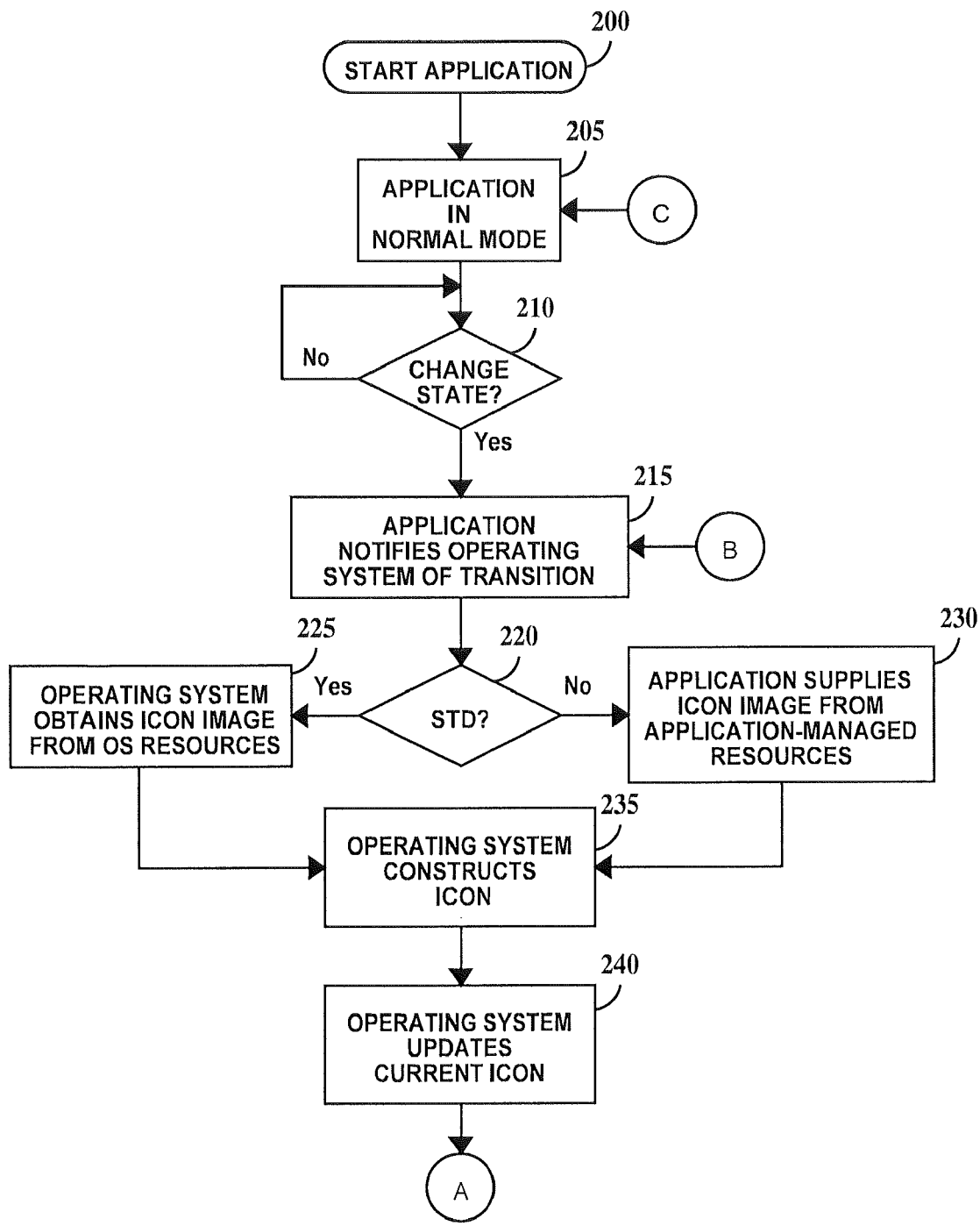
FIGS. 7A and 7B are flowcharts illustrating the method of user notification of a state transition of an out-of-focus application according to embodiments of the present invention.
Figure 7B:
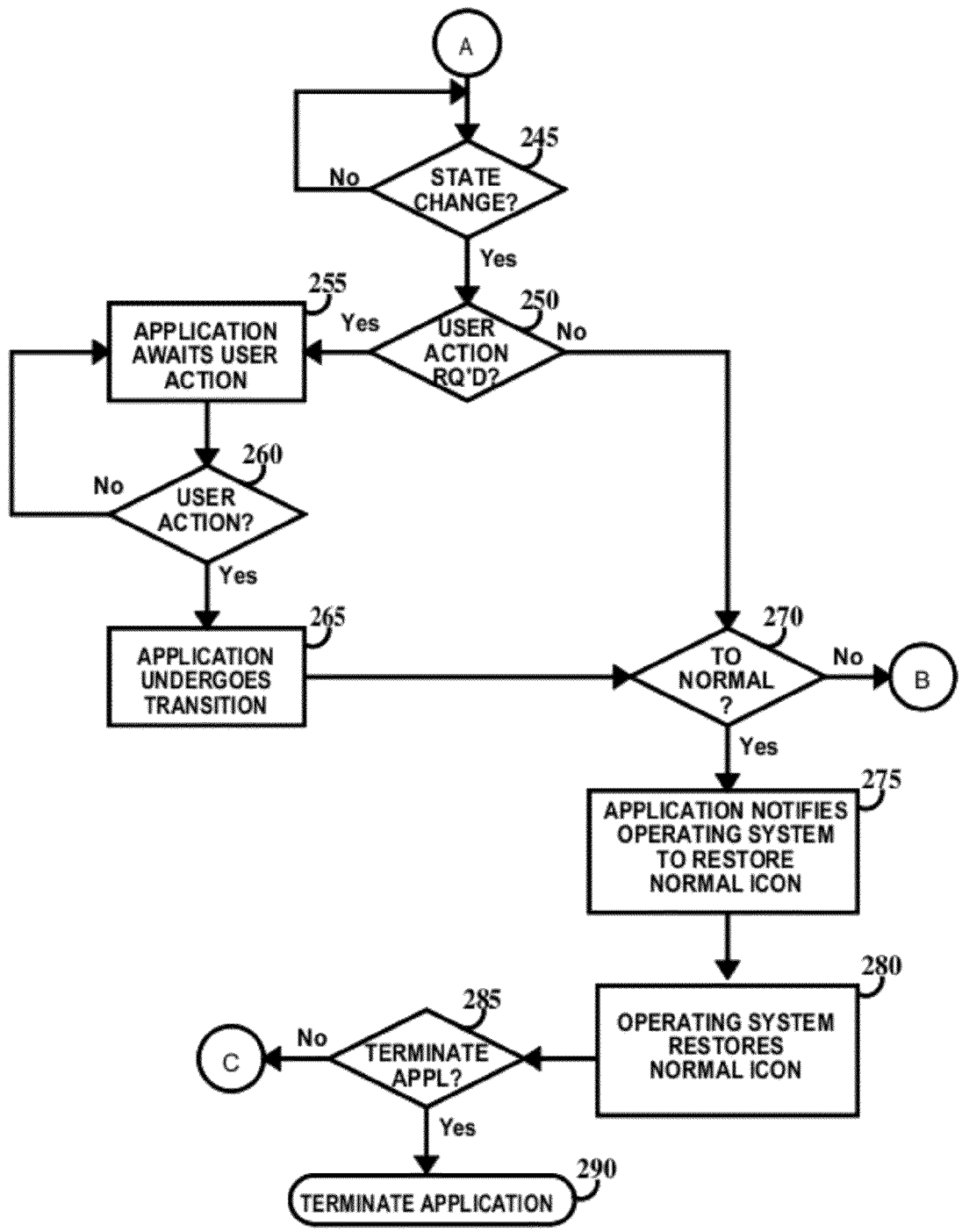

FIGS. 7A and 7B are flowcharts illustrating the method of user notification of a state transition of an out-of-focus application according to embodiments of the present invention. In step 200 the user starts an application. Alternatively, the application is started by the operating system (OS) at boot-up, at a predetermined time or day, or by another application. In step 205, the application is initialized to a normal state (i.e. idle), the application minimized (placed in out-of-focus mode) by the user, OS, or another application and a normal icon placed in the task button. In step 210, the application continually monitors itself for a change in state until a change in state occurs and the method proceeds to step 215. Examples of changes of state include but are not limited to, transitions from an idle state to processing state and vice versa, from a processing state to a input required state and vice versa, from the processing state to an error state and vice versa, and from one processing state to another processing state. A processing state is a state where the program is performing a normal task, such as a calculation, a search, downloading/uploading from/to a server, retrieving/storing information and other tasks the application was designed to perform.

In step 215, the application notifies the OS of a change in state. In step 220 it is determined if the transition is to a standard state. A standard state is a state that the application enters that has the same semantics across different applications. (for example, an error state or a user input required state). If the transition is a to a standard state, then in step 225, the OS obtains an icon image from OS managed resources, otherwise, in step 230, the application supplies an overlay icon image from application managed resources. Next in step 235, the OS constructs an updated icon and in step 240 the OS replaces the current icon (a desktop icon, a task button icon, or both) with the updated icon. The updated icon is a normal icon, an overlay icon on top of the normal icon or a new construct icon combining of both the normal icon image and the overlay icon image. The method then proceeds to step 245 of FIG. 7B.

Turning to FIG. 7B, in step 245 the application continually monitors itself for a change of state. When a change of state is detected, the method proceeds to step 250. In step 250, it is determined if user action is required. If user action is required then the method proceeds to step 255 where the application is put into a wait for user action mode and in step 260 the application continually monitors itself for user action. Then, when user action occurs, in step 265, the application undergoes the state transition and the method proceeds to step 270. Returning to step 250, if the transition requires no user action then the method proceeds directly to step 270. In step 270 if the transition is to normal mode then the method proceeds to step 275, otherwise the method proceeds to step 215 of FIG. 7A.

In step 275, the application notifies the OS to replace the current icon with the normal icon and in step 280 the OS restores the normal icon. Next in step 285, it is determined if the application is to terminate (either with or without user input). If the application is to terminate, then in step 290 the application is terminated and any task buttons removed from the taskbar. Otherwise the method proceeds to step 205 of FIG. 7A.

Figure 8:
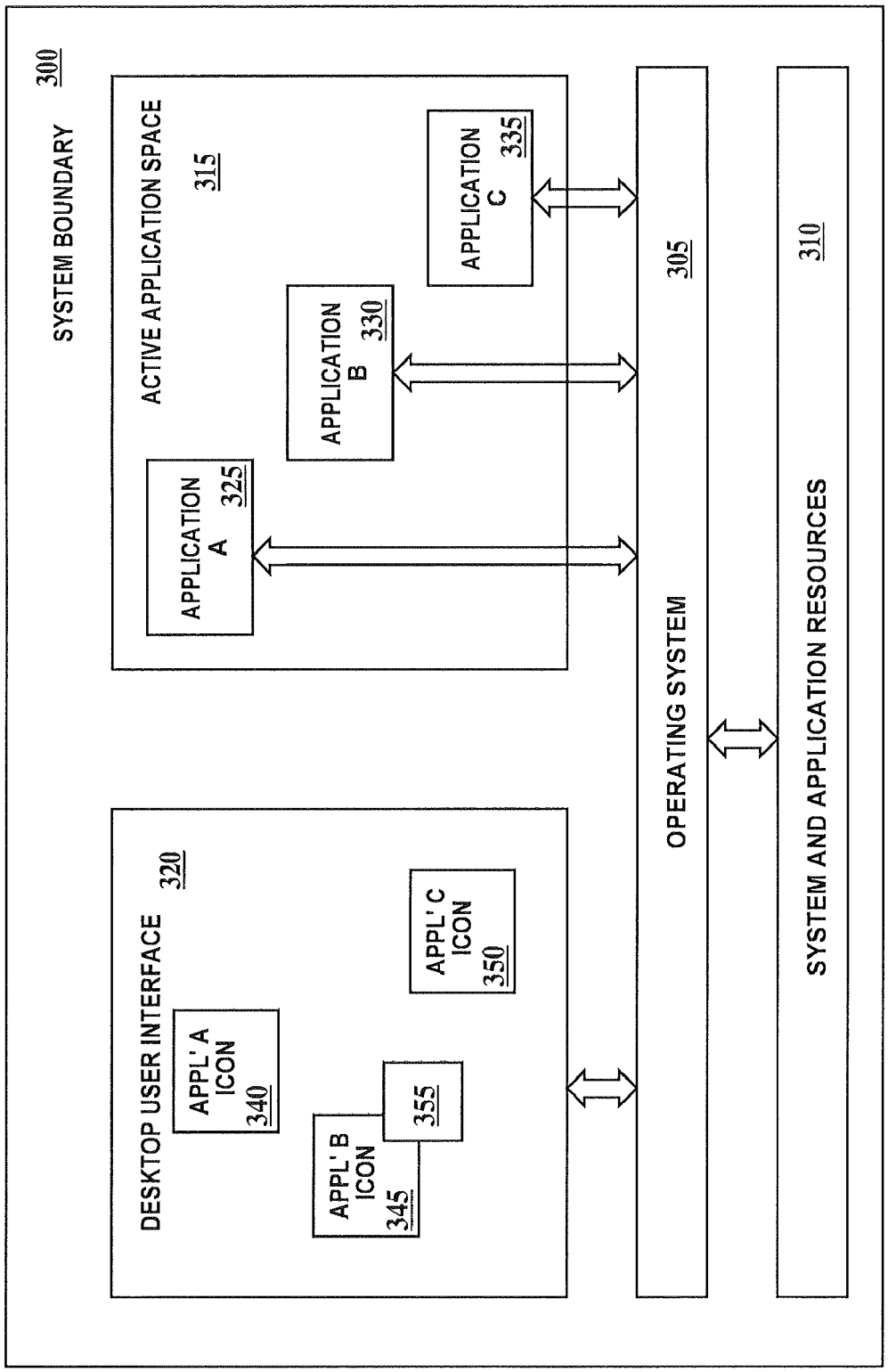
FIG. 8 is a system diagram for implementing the method of user notification of a state transition of an out-of-focus application according to embodiments of the present invention.

FIG. 8 is a system diagram for implementing the method of user notification of a state transition of an out-of-focus application according to embodiments of the present invention. In FIG. 8, a system boundary 300 includes an OS 305, system and application resources 310, active application space 315 and a desktop user interface 320. Active application space 315 includes exemplary applications 325, 330 and 335. Application 325 is in-focus and applications 330 and 335 are out-of-focus. Application 330 in a non-normal state and application 350 is in a normal state. Desktop user interface 320 includes icons 340, 345 and 350. Icons 340, 345 and 350 are associated respectively with applications 325, 330 and 335. Icon 345 includes and overlay icon 355.

Applications 325, 330 and 335 interface with OS 305. OS 305 interfaces with system and application resources 310 and desktop user interface 320. Non-normal icon images and overlay icon images for applications 325, 330 and 335 are passed to system and application resources 310 through OS 305. When icons 340, 345 and 350 are to be constructed as well as overlay icons such as 355, the icon image resources are retrieved from system and application resources 310 by the OS and the icons constructed in desktop user interface 320 by the OS.

Generally, the method described herein with respect to user notification of a state transition of an out-of-focus application is practiced with a general-purpose computer and the method may be coded as a set of instructions on removable or hard media for use by the general-purpose computer.

Figure 9:
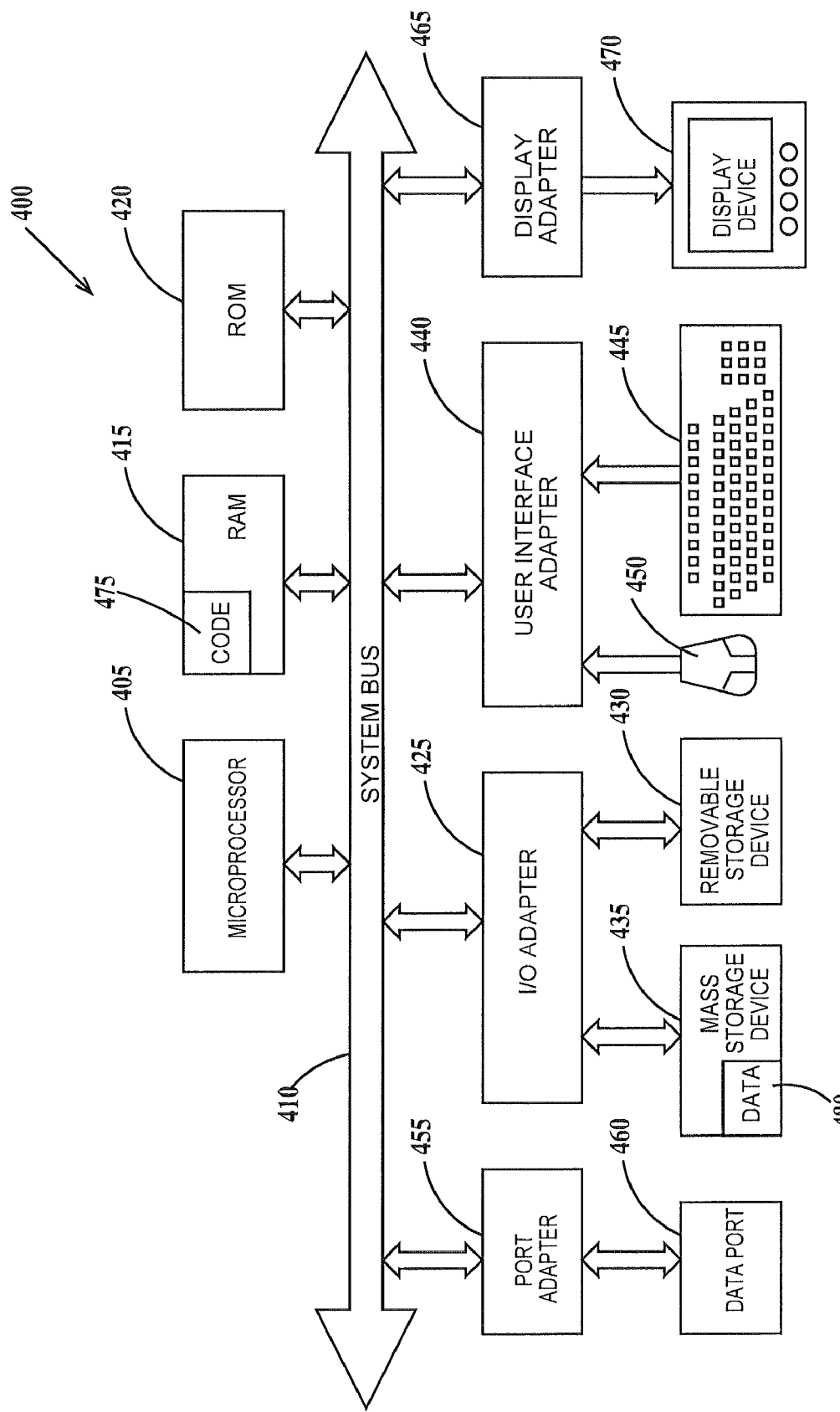
FIG. 9 is a schematic block diagram of a general-purpose computer for practicing the embodiments of the present invention.

FIG. 9 is a schematic block diagram of a general-purpose computer for practicing the embodiments of the present invention. In FIG. 9, computer system 400 has at least one microprocessor or central processing unit (CPU) 405. CPU 405 is interconnected via a system bus 410 to a dynamic random access memory (DRAM) device 415 and a read-only memory (ROM) device 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

Either of devices 415 and 420 includes contains the basic operating system for computer system 400. Removable data and/or program storage device 430 may be a magnetic media such as a floppy drive, a tape drive or a removable hard disk drive or optical media such as CD ROM or a digital video disc (DVD) or solid state memory such as ROM or DRAM or flash memory. Mass data and/or program storage device 435 may be a hard disk drive or an optical drive. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

One of devices 415, 420, 430 or 435 includes a computer code 475 (illustrated by way of example in device 415), which is a computer program that comprises computer-executable instructions. Computer code 475 includes an algorithm for notification of a user of a state transition of an out-of-focus software application (e.g. the algorithm of FIGS. 7A and 7B). CPU 405 executes computer code 475. Any of devices 415, 420, 430 or 435 may include input data 480 (illustrated by way of example in device 435) required by computer code 475. Display device 470 displays output from computer code 475.

Any or all of devices 415, 420, 430 and 435 (or one or more additional memory devices not shown in FIG. 9) may be used as a computer usable medium (or a computer readable medium or a program storage device) having a computer readable program embodied therein and/or having other data stored therein, wherein the computer readable program comprises computer code 475. Generally, a computer program product (or, alternatively, an article of manufacture) of the computer system 400 may comprise said computer usable medium (or said program storage device).

Further embodiments of the present invention described infra provide a capability for a user to control how application state transitions are handled. The user can configure the specific notification type or can configure rules to evaluate state change and select a specific notification type. Table I lists various states that an Application may be in.

TABLE I

| STATE | MEANING |
| --- | --- |
| Normal | The application is Idle |
| Processing | The application is performing a task such as a calculation, a search, downloading or uploading from or to a server, retrieving or storing information and other tasks the application was designed to perform. |
| Error | An error has occurred and user attention is needed. |
| Warning | A warning has occurred and user attention is required. |
| Information | Information is available for the user. |
| Input Required | Either input or some action is required from the user for the application to continue. |
| Application Defined | Specified by the application |

Normal, Processing, Warning, Information, Input Required and Error are states that are generic to all applications. Application Defined states are specific to each application.

When an application is out of focus and a transition of state (ST) occurs, the user needs to be notified. The user can determine how important a particular state transition is and what notification or action to take by specifying a notification priority (NP), which has a corresponding action associated with it. Table II lists an exemplary set of notification priorities and actions.

TABLE II

| NP | Action |
|---|---|
| Urgent | Interrupt the user by bringing the application in-focus or displaying a message box. |
| Normal | Wait a pre-defined duration of time before bringing the application in-focus or displaying a message box. |
| Low | Do not interrupt the user until this state transition has occurred a pre-defined number of times. Then bring the application in-focus or display a message box. |
| Passive | Do not interrupt the user. Change a display icon, display an overlay icon over the current icon, or change an overlay icon. |
| None | Ignore and do not change the display mode of the application. |
| Other | User defined notification action. |

Additionally, the user may define rules to determine what notification priority to use when a state transition occurs. For example, in an email application, when new mail arrives, the user may wish to be notified immediately (NP=Urgent) if the email has been marked "High Priority." In another example, if certain web-sites are slow to respond or do not respond, the user may wish to be notified after waiting a predetermined duration of time (NP=Normal). The rules query the events (state transition and environment) and determine the notification priority. In the email example above the following rule could be defined:

If email is marked High Importance,
Then NP=Urgent
Else Np=Passive

It should be noted that rules are restricted so as to result in the selection of a notification priority, but the user can generate new notification priorities and associated actions. Thus notification priorities may be considered rules that automatically select one notification priority.

Figure 10:
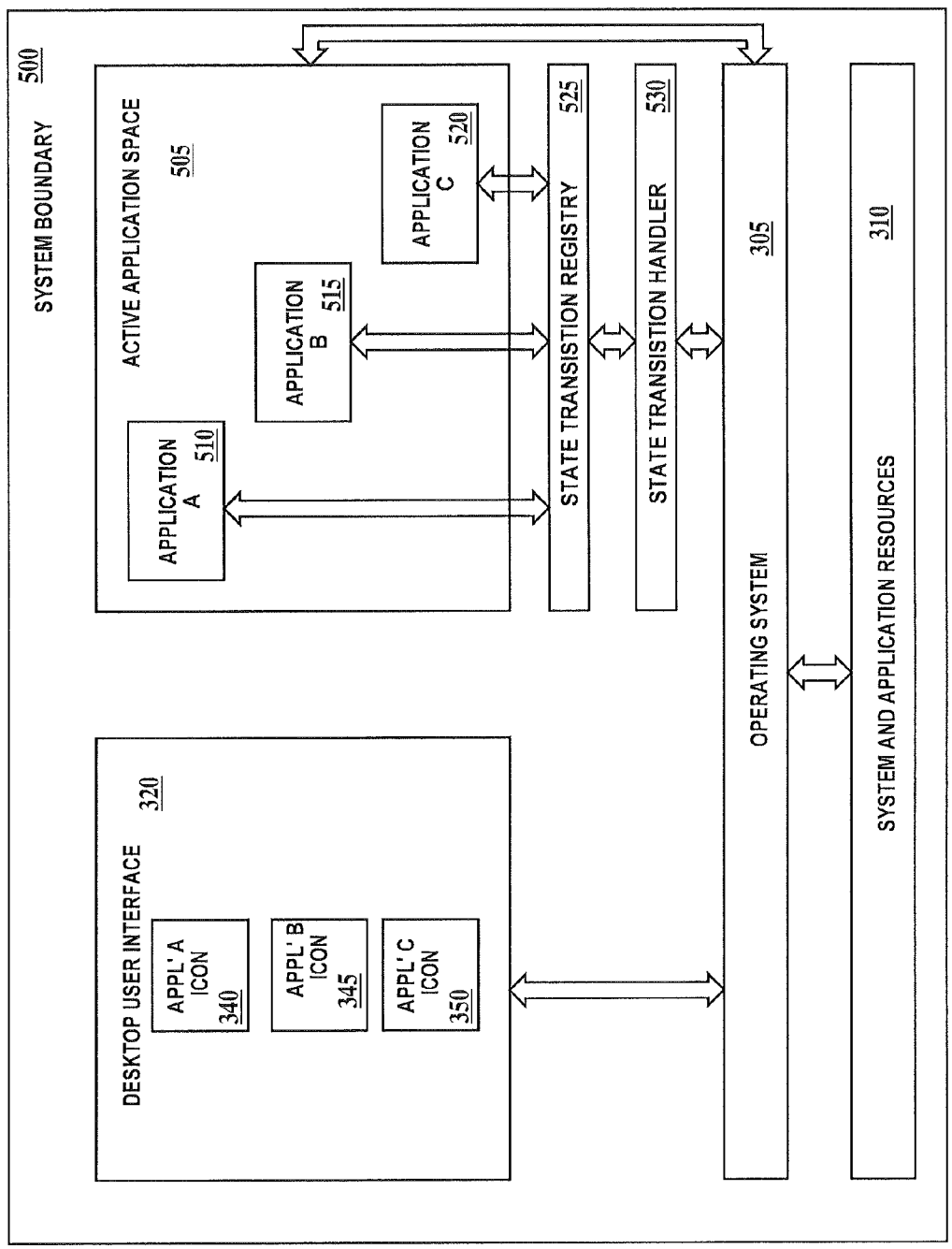
FIG. 10 is a system diagram for implementing the method of user notification of a state transition of an out-of-focus application according to further embodiments of the present invention.

FIG. 10 is a system diagram for implementing the method of user notification of a state transition of an out-of-focus application according to further embodiments of the present invention. In FIG. 10, a system boundary 500 is similar to system boundary 300 of FIG. 8 except active application space 315 is replaced with an active application space 505, applications 325, 330 and 335 are replaced with applications 510, 515 and 520 respectively and active application space 505 further includes a state transition registry 525 and a state transition handler 530. Also applications 325, 330 and 335 are connected to state transition registry 525 rather than operating system 305 as in FIG. 8. State transition handler 530 connects state transition registry 525 to operating system 305 and there is a secondary path between active application space 505 and operating system 305.

In FIG. 10, Application 510 is in focus, and applications 515 and 520 are out of focus. Each of applications 510, 515 and 520 has a corresponding application icon 340, 345 and 350 on desktop user interface 320. Applications 510, 515 and 520 are registered with state transitions registry 525. State transitions registry 525 maintains a list of possible states applications 510, 515 and 520 can be in. In one example, an application registers with the state transitions registry 525 when it is started for the first time. State transitions registry 525 also maintains state transitions configured by the user and the corresponding notification priorities or rules to be evaluated. When a pre-configured state transition occurs, state transitions registry 525 obtains the notification priority and delegates its handling to state transition handler 530. State transition handler 530 includes logic that either has a hardware module, a software module, or a combination of both to count the pre-defined unit of time for normal notification priorities and to count the number of times a particular state transition has occurred for low notification priorities and uses operating system 305 to process the notification priority.

Figures 11A, 11B:
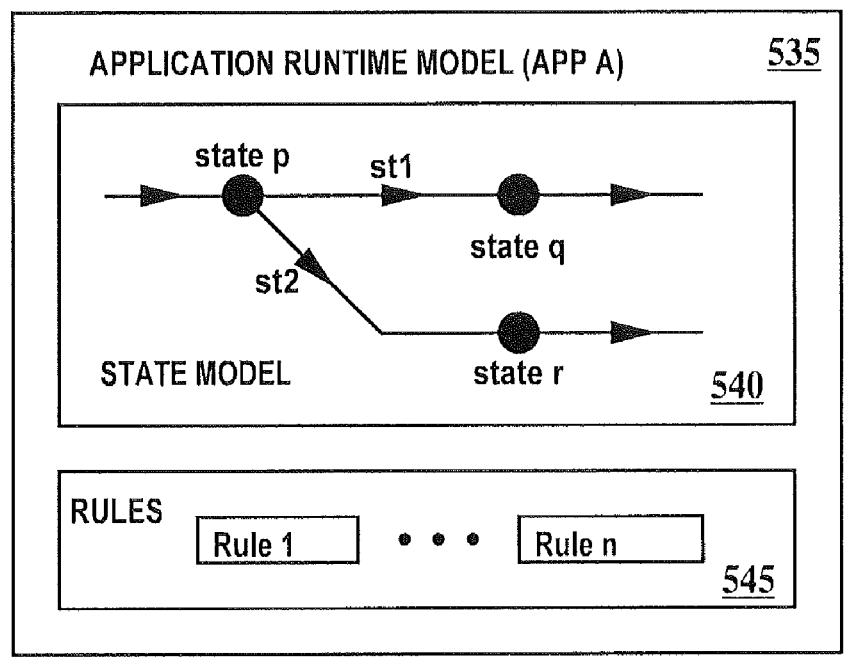
FIG. 11A is a schematic diagram of a portion of an application according to embodiments of the present invention.
FIG. 11B is a detailed diagram of the state transition registry of FIG. 10.

FIG. 11A is a schematic diagram of a portion of application 510 of FIG. 10 and FIG. 11B is a detailed diagram of the state transition registry of FIG. 10. according to embodiments of the present invention. In FIG. 11A, an application runtime model 535 includes a state model 540 and rules 545. Only a portion of the state model of application 510 (see FIG. 10) is illustrated in FIG. 11A. State model 540 shows there are two state transitions, st1 between state p and state q and st2 between state p and state r. It can be seen in FIG. 11B, that state transition st1 is associated with a notification priority URGENT, while state transition st2 is associated with a rule 1. In the case of st1, the notification priority is URGENT. Thus the user is interrupted when the application goes from state-p to state-q (see Table II). In the case of st2, a Rule 1 that is supplied by the application needs to be executed. The application executes Rule 1, and the rule outputs the notification priority to state transition registry 525 (see FIG. 10), which then informs state transition handler 530 (see FIG. 10) to process the notification priority. State transitions can be configured based on the ending state, the starting state or both the starting and ending states. In one example, the NP could always be URGENT if the ending state is an error state.

Figure 12A:
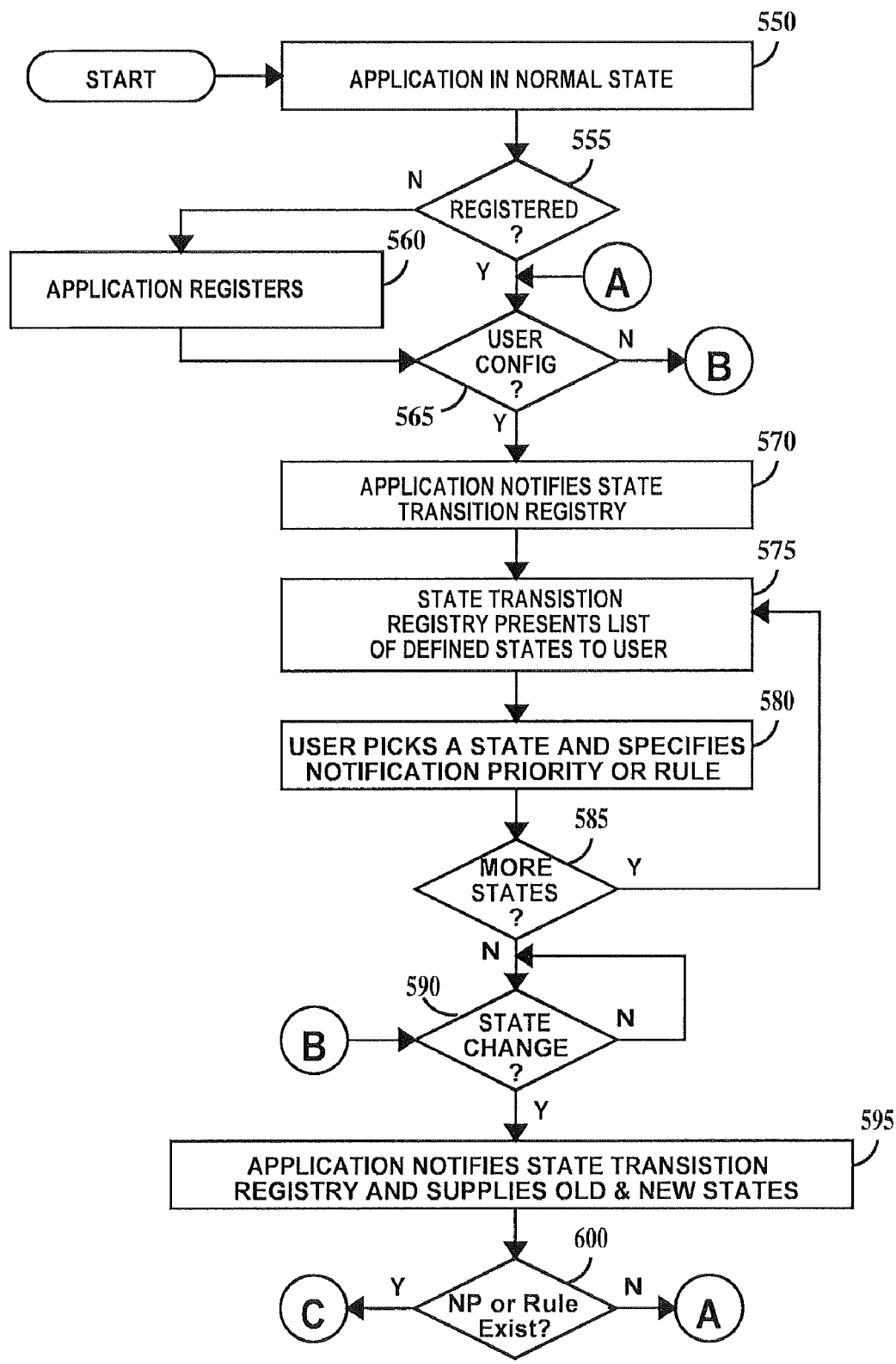
FIGS. 12A and 12B flowcharts illustrating the method of user notification of a state transition of an out-of-focus application according to further embodiments of the present invention.
Figure 12B:
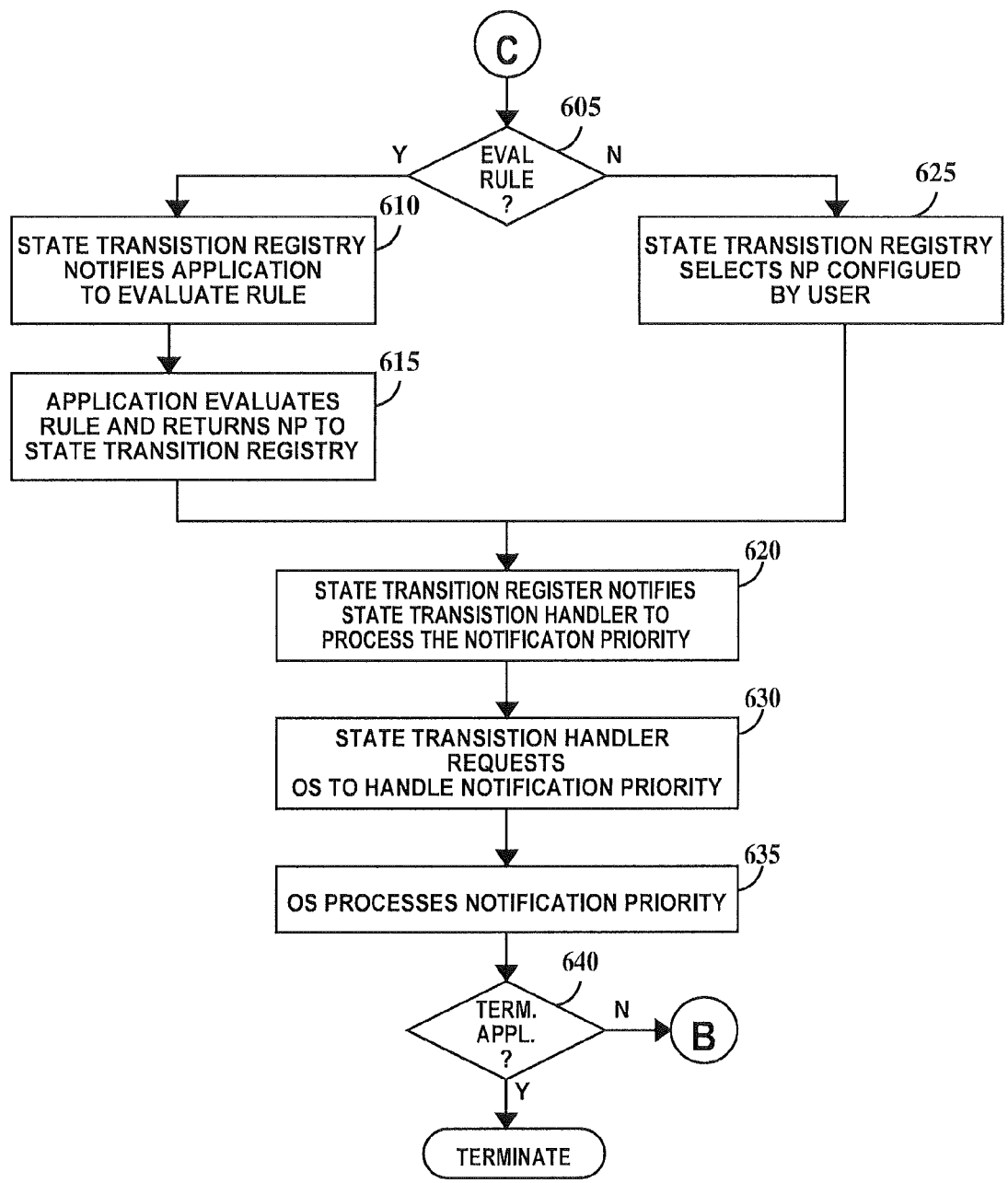

FIGS. 12A and 12B flowcharts illustrating the method of user notification of a state transition of an out-of-focus application according to further embodiments of the present invention. Referring to FIG. 12A, in step 550, the application enters the normal (or idle) state and is placed in out of focus mode by the user. In step 555, it is determined if the application is registered with the state transition registry. If the application is registered then the method proceeds to step 565. If the application is not registered, then in step 560 the application registers and the application supplies a list of defined state transitions and defined rules to the state transition registry and the method proceeds to step 565. Next, in step 565 if the user requests configuration of state transition notifications (which is automatic with the first time an application registers) then steps 570, 575, 580 and 585 are executed in sequence, otherwise the method proceeds to step 590 via connector B. In step 570, the application notifies the state transition register that the user wants to configure the state transition registry and in step 575, the state transition registry presents the list of defined states to the user. Next, in step 580, the user selects a state transition and assigns a notification priority or a rule to that state. In step 585, if more state transitions are to be configured, then the method loops to step 575, otherwise the method proceeds to step 590. In step 590 the state transition registry continually monitors the application for a change of state. If there is a change of state of the application then in step 595 the state transition registry examines the old and new states supplied by the application upon the state transition and in step 600 the state transition registry determines if a notification priority or rule is configured for that state transition. If no notification priority or rule is configured the method loops back to step 565 via connector A, otherwise the method proceeds to step 605 of FIG. 12B via connector C. Alternatively, instead of looping back to step 565, a default notification priority may be selected by the state transition registry and the method then proceeds to step 605.

Referring to FIG. 12B, in step 605 if a rule is to be evaluated then the method proceeds to step 610. In step 610 the state transition registry notifies the application to evaluate the rule and in step 612, the application evaluates the rule and returns the resulting notification priority to the state transition registry and the method proceeds to step 620. Returning to step 605, in step 605 if a rule is not to be evaluated (then there must be a notification priority) so the state transition registry selects the notification priority previously selected by the user for the current state transition and the method proceeds to step 620. Then, in step 620, the state transition registry notifies the state transition handler to process the notification priority, in step 630, the state transition handler requests the operating system to process the priority notification, and in step 635 the operating system processes the priority notification. The change in screen display as a result of the operating system processing a notification priority have been discussed supra. In step 640, it is determined if the application is to be terminated. If the application is to be terminated than the method ends, otherwise the method proceeds to step 590 of FIG. 12A via connector B.

Figure 13A:
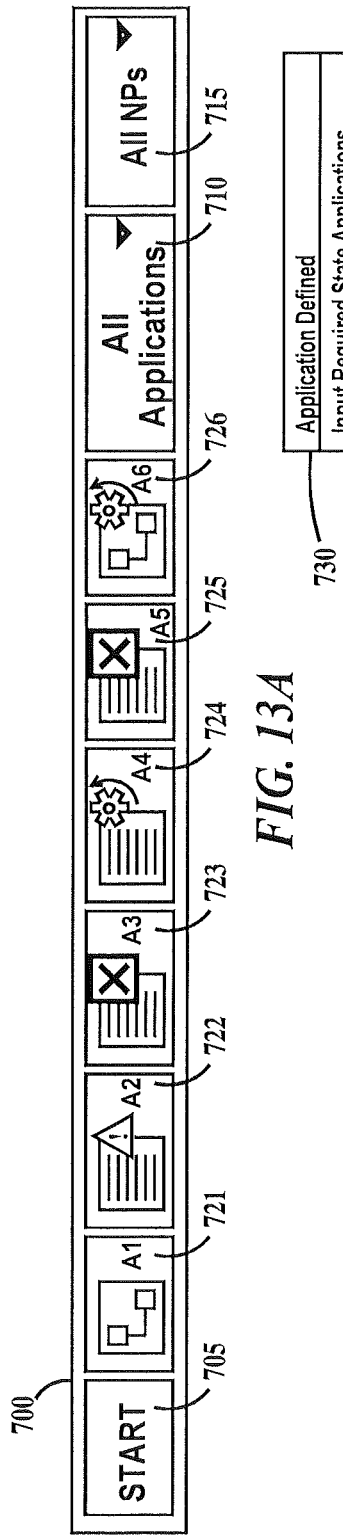
FIGS. 13A, 13B and 13C are schematic drawings of a user desktop taskbar illustrating application state filtering according to an embodiment of the present invention.
Figure 13B:
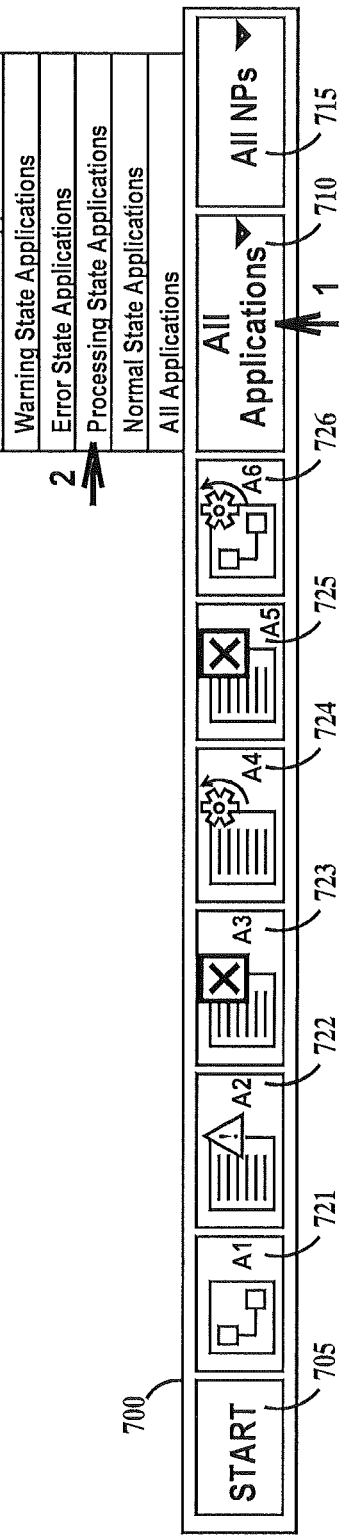
Figure 13C:
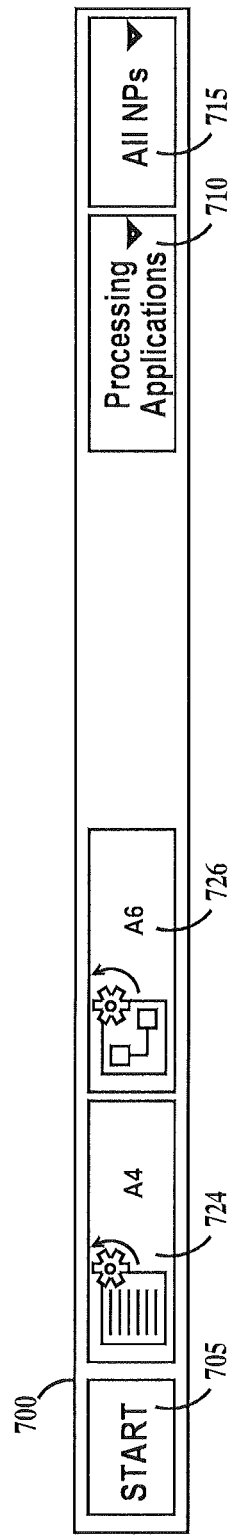

FIGS. 13A, 13B and 13C are schematic drawings of a user desktop taskbar illustrating application state filtering according to an embodiment of the present invention. In FIG. 13A, a taskbar 700 includes a start button 705, an application state filter select button 710 (at this time displaying the default label "All Applications") and an notification priority filter select button 715 (displaying the default label "All NPs" (notification priorities)). Additionally taskbar 700 is displaying six task buttons 721, 722, 723, 724, 725 and 726 which are similar to task buttons 125A and 12513 of FIGS. 1, 2, 3, 4, 5 and 6 and have essentially the same characteristics. Task button 721 controls display of application A1 which is in an idle state. Task button 722 controls display of application A2 which is in a warning state. Task button 723 controls display of application A3 which is in an error state. Task button 724 controls display of application A4 which is in a processing state. Task button 725 controls display of application A5 which is in an error state. Task button 726 controls display of application A6 which is in a processing state. Task buttons 722, 723, 724, 725 and 726 display overlay icons as described supra.

In FIG. 13B, application state filter select button 710 is selected (e.g., using a mouse or keystroke combination) which brings up pop-up menu 730. Pop Lip menu 730 displays a list of sub-select buttons for displaying all or a filtered set of the task buttons 721, 722, 723, 724, 725 and 726 on taskbar 700. The seven sub-select buttons labeled Normal State Applications, Processing State Applications, Error State Applications, Warning State Applications, Information State Applications, Input Required Applications and Application Defined Applications correspond to the states listed in TABLE I and described supra. Selecting a sub-select button from pop-up menu 730 will apply that filter to the task buttons displayed on taskbar 700. For example, selecting (e.g. using a mouse or key-stroke combination) the sub-select button labeled "Processing State Applications" will result in changing taskbar 700 to display only those applications that have a notification priority of "Normal" as illustrated in FIG. 13C.

In FIG. 13C, only applications A4 and A6 are displayed in taskbar 700. Also application state filter select button 710 is displaying the label "Processing Applications" which corresponds to the sub-select button selected in FIG. 13B. Selecting application state filter select button 710 again would display pop-up menu 730 (see FIG. 13B) again. Selecting any sub-select button would apply the selected filter to all running applications (in the present example A1, A2, A3, A4, A5, and A6) and the task buttons displayed on taskbar 700 which change accordingly as would the label displayed on application state filter select button 710.

Figure 14A:
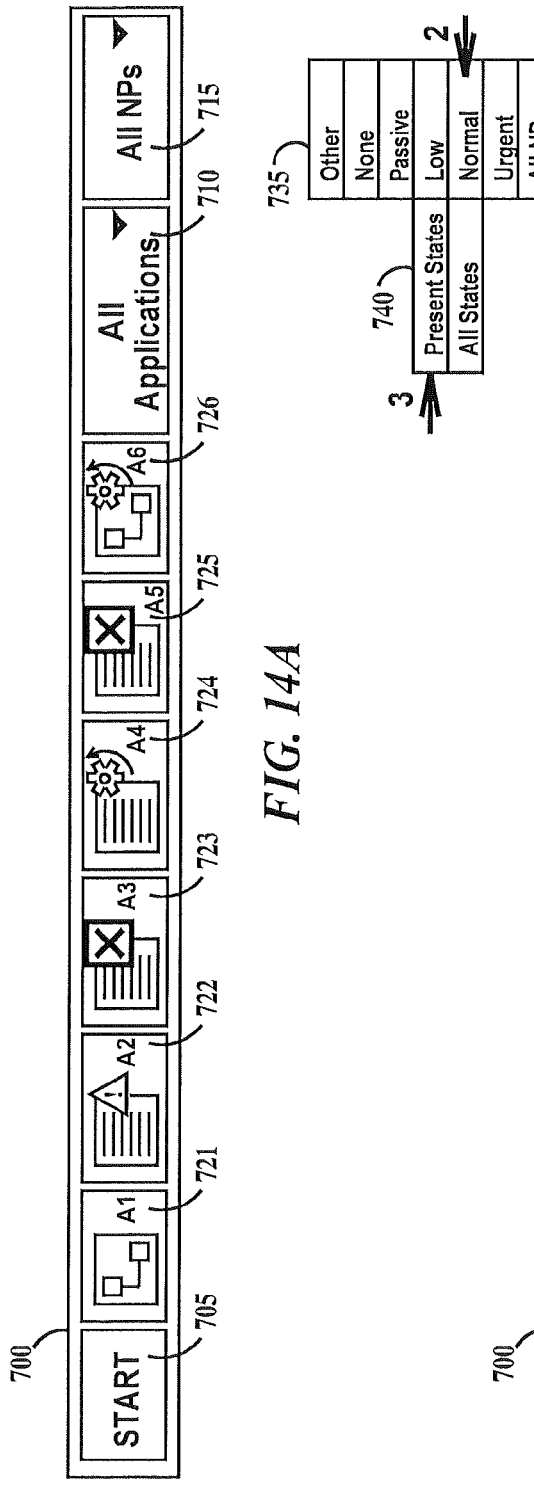
FIGS. 14A, 14B and 14C are schematic drawings of a user desktop taskbar illustrating notification priority filtering according to an embodiment of the present invention.
Figure 14B:
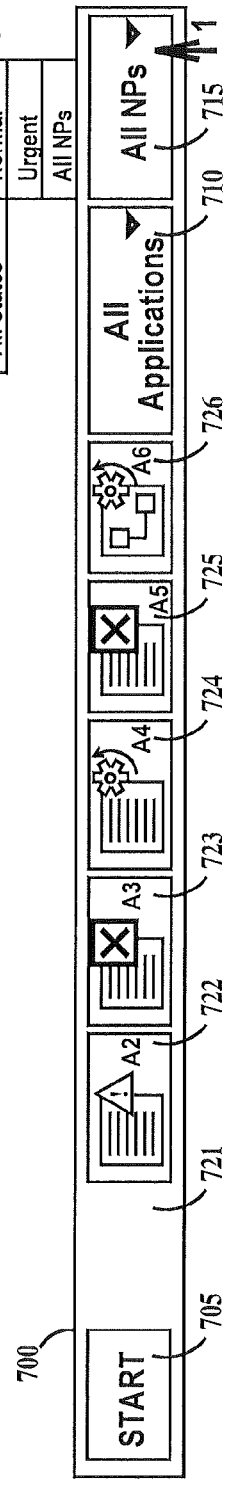
Figure 14C:
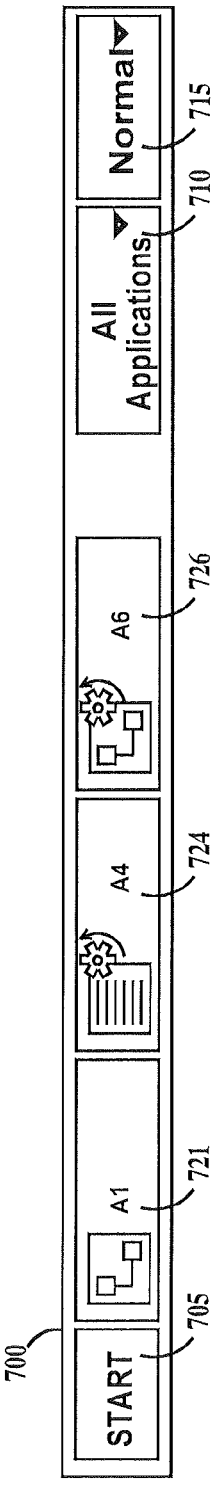

FIGS. 14A, 14B and 14C are schematic drawings of a user desktop taskbar illustrating according to an embodiment of the present invention. FIG. 14A is the same as FIG. 13A.

In FIG. 14B, notification priority filter select button 715 is selected (e.g., using a mouse or keystroke combination) which brings up pop-up menu 735. Pop up menu 735 displays a list of sub-select buttons for displaying all or a filtered set of the task buttons 721, 722, 723, 724, 725 and 726 on taskbar 700. The six sub-select buttons labeled Urgent, Normal, Low, Passive, None and Other correspond to the states listed in TABLE II and described supra. Selecting a sub-select button from pop-up menu 735 will apply that filter to the task buttons displayed on taskbar 700. For example, selecting (e.g. using a mouse or key-stroke combination) the sub-select button labeled "Normal" will result in changing taskbar 700 to display only those applications that are in the processing state as illustrated in FIG. 14C.

In FIG. 14C, only applications A1, A4 and A6 are displayed in taskbar 700. Also notification priority filter select button 715 is displaying the label "Normal" which corresponds to the sub-select button selected in FIG. 14B. Selecting notification priority filter select button 715 10 again would display pop-up menu 735 (see FIG. 14B) again. Selecting any sub-select button would apply the selected filter to all running applications (in the present example A1, A2, A3, A4, A5, and A6) and the task buttons displayed on taskbar 700 which change accordingly as would the label displayed on notification priority filter select button 715.

Returning to FIG. 14B, an optional sub-pop-up menu 740 is displayed. Sub-pop-up menu 740 lists algorithms that are available to be used to determine which state of the state transition (from or to) is used in selection of the corresponding notification priority. Sub-pop-up menu 740 includes sub-sub-select buttons labeled Present States and All States corresponding to TABLE III. Present State is the default. Sub-popup menu may be shown whenever Urgent, Normal, Low, Passive or Other is selected in pop-up menu 735. The actions of the sub-sub-select buttons are defined in TABLE III. When Configurable Rules are used in determining the notification priority, they may be incorporated into the algorithm. For example, within any particular application, a rule for "Present State" may be defined that is applicable only to that particular application. If any outcome of evaluation of the rule matches the notification priority of the selected state, then that particular application is selected to be included in task bar 700. A similar algorithm may be used for "All States."

TABLE III

| LOGIC | ALGORITHM |
| --- | --- |
| Present States | Select Applications with requested notification priority whose "from" state is the present state. |
| All States | Select applications with requested notification priority irrespective of their "from" and "to" states. |

Without sub-pop-up menu 740, a default algorithm is required.

Alternatively, the functions of TABLE III may be implemented as a properties box instead of sub-pop-up menu 740 and would be selected, for example, by clicking a mouse button when the mouse cursor is over one of the sub-select buttons of pop-up menu 735 (see FIG. 14B).

It should be understood that both the application state filter select button 710 and notification priority filter select button 715 may be used together so the task buttons displayed on taskbar 700 is a combination of both filter types. That is, task button s displayed would be for an application having an application state corresponding to the application state filter selected and a notification priority corresponding to the notification priority filter selected. It should also be understood that any new applications started will have task buttons created and displayed according to the state filter and notification priority filter in effect when a new application is started.

It should also be understood that an application state filter may be combined with a notification priority filter. For example, returning to FIG. 13B, pop-up menu 730 may contain a sub-select button "Processing State and Urgent" which would apply both the Processing State filter and the Urgent notification priority filter, so only those applications matching both filters would be displayed in task bar 700.

Figure 15:
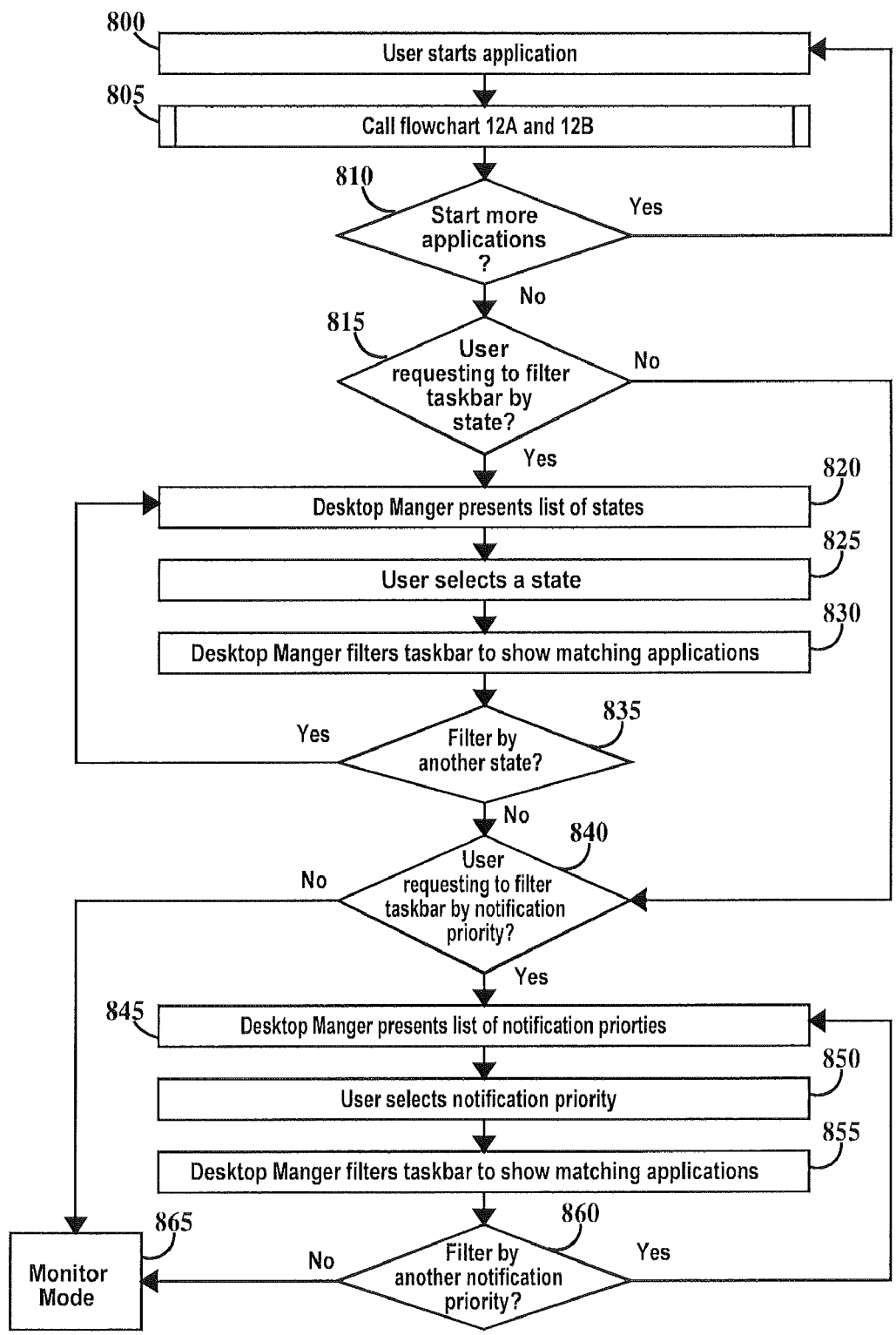
FIG. 15 is a flowchart illustrating a method of application state filtering and notification priority filtering according to embodiments of the present invention.

FIG. 15 is a flowchart illustrating a method of application state filtering and notification priority filtering according to embodiments of the present invention. In step 800, a user starts an application. In step 805 the process illustrated in FIGS. 12A and 12B and described supra are called as a sub-routine. In step 810, if more applications are to be started the method loops back to step 800 otherwise the method proceeds to step 815. In step 815 it is determined if the user is requesting to filter the taskbar by state. If not the method proceeds to step 840 otherwise the method proceeds to step 820.

In step 820, a Desktop Manager presents the list of state filters and in step 825 the user selects a state filter. A Desktop Manager is defined as a software application that manages requests for display of objects on the desktop and implements display of those objects in the desktop. The desktop is normally displayed on a computer screen. Then in step 830, the Desktop Manager filters the active applications and displays task buttons associated with the applications meeting the filter requirements on the tool-bar of the desktop. Then the method proceeds to step 835. In step 835, it is determined if another state filter has been selected. If another state filter has been selected the method loops to step 820 otherwise the method proceeds to step 840.

In step 840 it is determined if the user is requesting to filter the taskbar by notification priority. If not the method proceeds to step 865 otherwise the method proceeds to step 845.

In step 845, the Desktop Manager presents the list of state filters and in step 825 the user selects a state filter. Then in step 850 the user selects a notification priority. Next in step 855, the Desktop Manager filters the active applications and displays task buttons associated with the applications meeting the filter requirements on the tool-bar of the desktop. Then the method proceeds to step 860. In step 860, it is determined if another notification filter has been selected. If another notification filter has been selected the method loops to step 845 otherwise the method proceeds to step 864 which is a monitoring step.

It should be understood that steps 840 and 860 are implemented as sampling states from monitoring step 865 and the "Yes" and "No" paths from steps 840 and 860 are activated in response to a user selecting either application state filter select button 710 or notification priority filter select button 715 (see FIG. 13A or 14A). Likewise, steps 800 and 805 can be performed any time and the state and priority notification filters currently active at the time the new application is started are applied to the new application and the taskbar display is adjusted accordingly.

Figure 16:
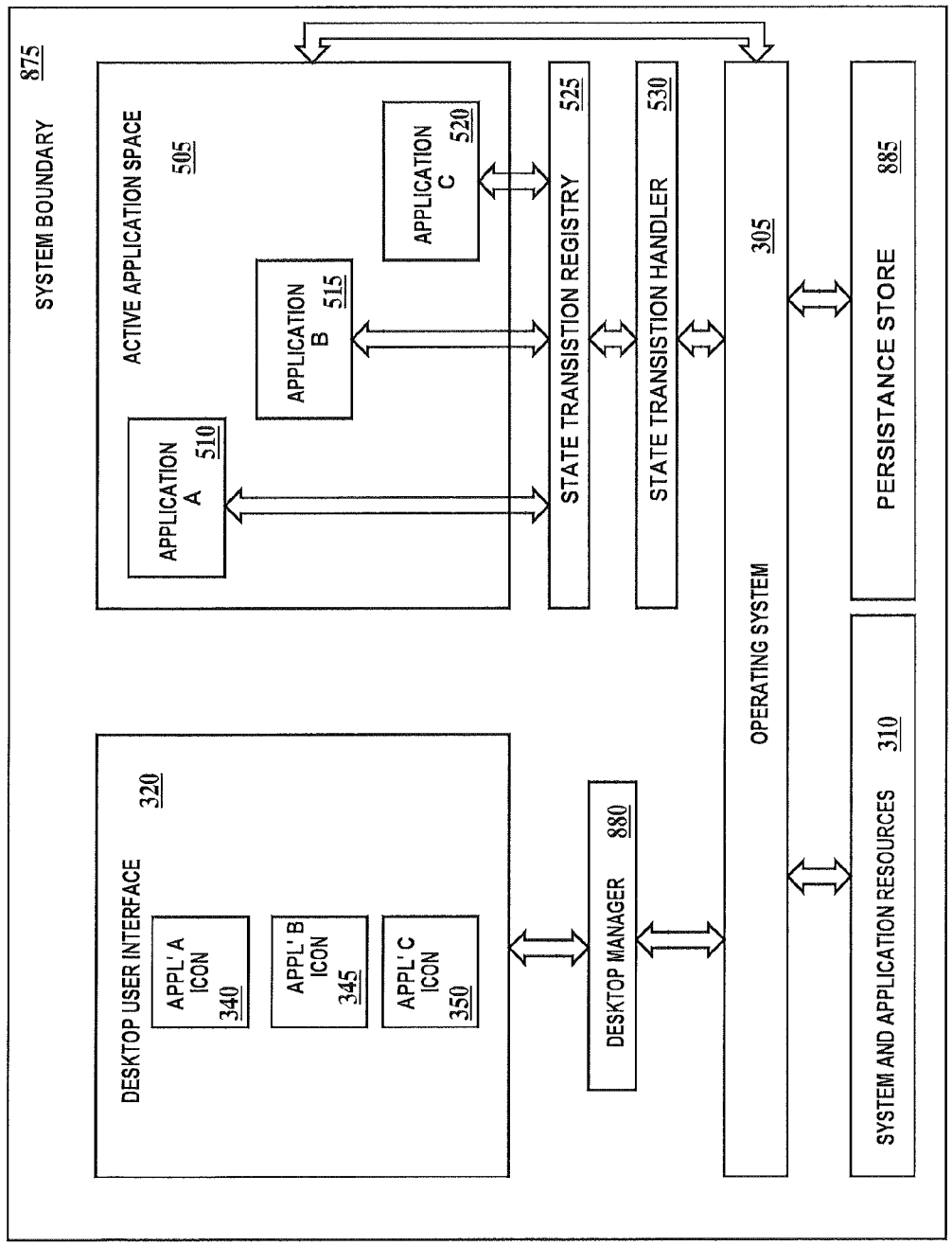
FIG. 16 is a system diagram for implementing the method of user notification of a state transition of an out-of-focus application and for application state and notification priority filtering according to embodiments of present invention.

FIG. 16 is a system diagram for implementing the method of user notification of a state transition of an out-of-focus application and for application state and notification priority filtering according to embodiments of present invention. In FIG. 16, a system boundary 875 is similar to system boundary 500 of FIG. 10 except for the addition of a desktop manager 880 between operating system 305 and desktop user interface 320 and the addition of a persistence store 885 connected to operating system 305. Desktop manager 880 handles all filtering requests from the user and persistence store 885 remembers the task button display image, properties and functions.

Thus the present invention discloses a process for supporting computer infrastructure, integrating, hosting, maintaining, and deploying computer-readable code into the computer system, wherein the code in combination with the computer system is capable of performing a method for user notification of a state transition of an out-of-focus application as well as a method for filtering task buttons displayed on a computer screen associated with the applications.

Thus the embodiments of the present invention provide a method for applications to notify the user of an applications status or need for attention without interrupting the user and the application the user is currently working with as well as a method to select and filter application status displays as well as a method for filtering task buttons displayed on a computer screen associated with the applications.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. For example, other control widgets may be substituted for task buttons. Therefore it is intended that the following claims cover all such modifications and changes as fall within the true spirit and scope of the invention.

What is claimed is:

1. A method, comprising:
    starting one or more applications, each application of said one or more applications having multiple possible states;
    displaying a taskbar on a computer screen, said taskbar having an application state filter select button;
    creating a corresponding task button representing each application of said one or more applications;
    upon selection of said application state filter select button, displaying a list of state filters on said computer screen; and
    upon selection of a state filter from said list of state filters, displaying task buttons corresponding only to those applications presently in a state corresponding to said selected state filter.

2. The method of claim 1:
    wherein each state filter of said list of state filters is independently selected from the group consisting of an idle state filter, a processing state filter, an error state filter, a warning state filter, an information state filter, an input required state filter, one or more application specific state filters and an all states filter; and
    further including displaying a label on said application state filter select button indicating which state filter of said list of states filters is currently selected.

3. The method of claim 1, further including:
upon selection of a new state filter from said list of state filters displaying said task buttons corresponding only to those applications presently in a state corresponding to new state filter.

4. The method of claim 1, further including:
placing a notification priority filter select button on said taskbar, wherein each application of said one or more applications has corresponding notification priorities based on each possible state transition each application of said one or more applications can undergo;
upon selection of said notification priority filter select button, displaying a list of notification priority filters on said computer screen; and
upon selection of a notification priority filter from said list of notification priority filters, displaying task buttons corresponding only to those applications having state transitions resulting in a notification priority corresponding to said selected notification priority filter.

5. The method of claim 4:
wherein each notification priority filter of said list of notification filters is independently selected from the group consisting of an urgent notification filter, a normal notification filter, a low notification filter, a passive notification filter, a none notification filter and a user defined notification filter; and
further including displaying a label on said notification priority filter select button indicating which notification priority filter from said list of notification priority filters is currently selected.

6. The method of claim 4, further including:
upon selection of a new notification priority filter from said list of notification priority filters, displaying task buttons corresponding only to those applications having state transitions resulting in a notification priority corresponding to said new notification priority filter.

7. The method of claim 4, further including:
upon selection of said notification priority filter, displaying a list of notification priority algorithms, each notification priority algorithm of said set of notification priority algorithms modifying the action of said selected notification priority filter when selected.

8. The method of claim 1, wherein said taskbar is the taskbar of a computer operating system.

9. The method of claim 1, further including:
starting a new application;
creating a new task button representing said new application; and
displaying said new task button only if said new application is in a state corresponding to said selected state filter.

10. A computer program product, comprising a computer useable medium having a computer readable program therein, wherein the computer readable program when executed on a computer causes the computer to:
load one or more applications into a computer memory, each application of said one or more applications having multiple possible states;
display a taskbar on a computer screen, said taskbar having an application state filter select button;
create a task button representing each application of said one or more applications;
upon selection of said application state filter select button, display a list of state filters on said computer screen; and
upon selection of a state filter from said list of state filters, display task buttons corresponding only to those applications presently in a state corresponding to said selected state filter.

11. The computer program product of claim 10:
wherein each state filter of said list of state filters is independently selected from the group consisting of an idle state filter, a processing state filter, an error state filter, a warning state filter, an information state filter, an input required state filter, one or more application specific state filters and an all states filter; and
wherein the computer readable program when executed on a computer further causes the computer to display a label on said application state filter select button indicating which state filter of said list of states filters is currently selected.

12. The computer program product of claim 10, wherein the computer readable program when executed on a computer further causes the computer to:
upon selection of a new state filter from said list of state filters displaying said task buttons corresponding only to those applications presently in a state corresponding to new state filter.

13. The computer program product of claim 10, wherein the computer readable program when executed on a computer further causes the computer to:
place a notification priority filter select button on said taskbar, wherein each application of said one or more applications has corresponding notification priorities based on each possible state transition each application of said one or more applications can undergo;
upon selection of said notification priority filter select button, display a list of notification priority filters on said computer screen; and
upon selection of a notification priority filter from said list of notification priority filters, display task buttons corresponding only to those applications having state transitions resulting in a notification priority corresponding to said selected notification priority filter.

14. The computer program product of claim 13:
wherein each notification priority filter of said list of notification filters is independently selected from the group consisting of an urgent notification filter, a normal notification filter, a low notification filter, a passive notification filter, a none notification filter and a user defined notification filter; and
wherein the computer readable program when executed on a computer further causes the computer to display a label on said notification priority filter select button indicating which notification priority filter from said list of notification priority filters is currently selected.

15. The computer program product of claim 13, wherein the computer readable program when executed on a computer further causes the computer to:
upon selection of a new notification priority filter from said list of notification priority filters, displaying task buttons corresponding only to those applications having state transitions resulting in a notification priority corresponding to said new notification priority filter.

16. The computer program product of claim 13, wherein the computer readable program when executed on a computer further causes the computer to:
upon selection of a notification priority filter, display a list of notification priority algorithms, each notification priority algorithm of said set of notification priority algorithms, when selected, modifies the action of said selected notification priority filter.

17. The computer program product of claim 10, wherein said taskbar is the taskbar of a computer operating system.

18. The computer program product of claim 10, further including:
starting a new application;
creating a new task button representing said new application; and
displaying said new task button only if said new application is in a state corresponding to said selected state filter.

19. A computer system comprising a processor, an address/data bus coupled to said processor, and a computer-readable memory unit coupled to communicate with said processor, said memory unit containing instructions that when executed implement a method for dynamically notifying a user of a change in state of an application running on said computer system, said method comprising the computer implemented steps of:
loading one or more applications into said memory unit, each application of said one or more applications having multiple possible states;
displaying a taskbar on a computer screen, said taskbar having an application state filter select button;
creating a corresponding task button representing each application of said one or more applications;
upon selection of said application state filter select button, displaying a list of state filters on said computer screen; and
upon selection of a state filter from said list of state filters, displaying task buttons corresponding only to those applications presently in a state corresponding to said selected state filter.

20. The computer system of claim 19:
wherein each state filter of said list of state filters is independently selected from the group consisting of an idle state filter, a processing state filter, an error state filter, a warning state filter, an information state filter, an input required state filter, one or more application specific state filters and an all states filter; and
the method further including displaying a label on said application state filter select button indicating which state filter of said list of states filters is currently selected.

21. The computer system of claim 19, the method further including:
upon selection of a new state filter from said list of state filters displaying said task buttons corresponding only to those applications presently in a state corresponding to new state filter.

22. The computer system of claim 19, the method further including:
placing a notification priority filter select button on said taskbar, wherein each application of said one or more applications has corresponding notification priorities based on each possible state transition each application of said one or more applications can undergo;
upon selection of said notification priority filter select button, displaying a list of notification priority filters on said computer screen; and
upon selection of a notification priority filter from said list of notification priority filters, displaying task buttons corresponding only to those applications having state transitions resulting in a notification priority corresponding to said selected notification priority filter.

23. The computer system of claim 22:
wherein each notification priority filter of said list of notification filters is independently selected from the group consisting of an urgent notification filter, a normal notification filter, a low notification filter, a passive notification filter, a none notification filter and a user defined notification filter; and
the method further including displaying a label on said notification priority filter select button indicating which notification priority filter from said list of notification priority filters is currently selected.

24. The computer system of claim 22, the method further including:
upon selection of a new notification priority filter from said list of notification priority filters, displaying task buttons corresponding only to those applications having state transitions resulting in a notification priority corresponding to said new notification priority filter.

25. The computer system of claim 22, the method further including:
upon selection of said notification priority filter, displaying a list of notification priority algorithms, each notification priority algorithm of said set of notification priority algorithms modifying the action of said selected notification priority filter when selected.

26. The computer system of claim 19, wherein said taskbar is the taskbar of a computer operating system.

27. The computer system of claim 19, further including:
starting a new application;
creating a new task button representing said new application; and
displaying said new task button only if said new application is in a state corresponding to said selected state filter.

28. A process for supporting computer infrastructure, said process comprising providing at least one support service for at least one of creating, integrating, hosting, maintaining, and deploying computer-readable code in a computing system, wherein the code in combination with the computing system is capable of performing a method for user filtering taskbar display of application task buttons, said method comprising:
loading one or more applications into a computer memory, each application of said one or more applications having multiple possible states;
displaying a taskbar on a computer screen, said taskbar having an application state filter select button;
creating a corresponding task button representing each application of said one or more applications;
upon selection of said application state filter select button, displaying a list of state filters on said computer screen; and
upon selection of a state filter from said list of state filters, displaying task buttons corresponding only to those applications presently in a state corresponding to said selected state filter.

29. The process for supporting computer infrastructure of claim 28, the method further including:
upon selection of a new state filter from said list of state filters displaying said task buttons corresponding only to those applications presently in a state corresponding to new state filter.

30. The process for supporting computer infrastructure of claim 28, the method further including:
placing a notification priority filter select button on said taskbar, wherein each application of said one or more applications has corresponding notification priorities based on each possible state transition each application of said one or more applications can undergo;
upon selection of said notification priority filter select button, displaying a list of notification priority filters on said computer screen; and upon selection of a notification priority filter from said list of notification priority filters, displaying task buttons corresponding only to those applications having state transitions resulting in a notification priority corresponding to said selected notification priority filter.

31. The process for supporting computer infrastructure of claim 30, the method further including:
upon selection of a new notification priority filter from said list of notification priority filters, displaying task buttons corresponding only to those applications having state transitions resulting in a notification priority corresponding to said new notification priority filter.

32. The process for supporting computer infrastructure of claim 28, wherein said taskbar is the taskbar of a computer operating system.

33. The process for supporting computer infrastructure of claim 28, further including:
starting a new application;
creating a new task button representing said new application; and
displaying said new task button only if said new application is in a state corresponding to said selected state filter.

* * * * *